US012609258B2

(12) United States Patent
Beltan et al.

(10) Patent No.: US 12,609,258 B2
(45) Date of Patent: Apr. 21, 2026

(54) TWO-ELECTRIC-POLE CIRCUIT BREAKER ACTUATED BY A COMMON PYROTECHNIC DEVICE

(71) Applicant: SAFRAN ELECTRICAL & POWER, Blagnac Cedex (FR)

(72) Inventors: Cecil Beltan, Moissy Cramayel (FR); Kévin Enouf, Moissy Cramayel (FR); Guillaume Prieur, Moissy Cramayel (FR); Arnaud Badault, Moissy Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 325 days.

(21) Appl. No.: 18/294,944

(22) PCT Filed: Aug. 1, 2022

(86) PCT No.: PCT/FR2022/051541
§ 371 (c)(1),
(2) Date: Feb. 2, 2024

(87) PCT Pub. No.: WO2023/012431
PCT Pub. Date: Feb. 9, 2023

(65) Prior Publication Data

US 2024/0387126 A1 Nov. 21, 2024

(30) Foreign Application Priority Data

Aug. 3, 2021 (FR) ....................................... 2108426

(51) Int. Cl.

| | |
|---|---|
| ***H01H 39/00*** | (2006.01) |
| ***H01H 33/18*** | (2006.01) |
| ***H01H 73/04*** | (2006.01) |

(52) U.S. Cl.
CPC ........ *H01H 39/006* (2013.01); *H01H 33/182* (2013.01); *H01H 73/045* (2013.01)

(58) Field of Classification Search
CPC .. H01H 39/006; H01H 33/182; H01H 73/045; H01H 9/346; H01H 39/002;
(Continued)

(56) References Cited

U.S. PATENT DOCUMENTS 2,999,912 A 9/1961 Kincaid et al.
12,009,167 B2 * 6/2024 Loeffelbein .......... H01H 39/006
(Continued)

FOREIGN PATENT DOCUMENTS

DE 1224391 B 9/1966
DE 102014110825 A1 9/2014
(Continued)

OTHER PUBLICATIONS

Search Report for French Patent Application No. 2108426, dated Mar. 31, 2022.
(Continued)

*Primary Examiner* — Ahmed M Saeed
(74) *Attorney, Agent, or Firm* — McDonald Hopkins LLC

(57) ABSTRACT

Two electric poles are controlled in one and the same circuit breaker by an undivided opening mechanism controlled by a pyrotechnic actuator. The opening of the circuit that is brought about by this actuator, which is fast for a large opening travel of the mobile contacts, makes it possible to extinguish electric arcs under good conditions. The poles may be placed in series on one and the same electrical circuit in order to reduce the potential difference across the terminals of each of them, thereby further increasing the effectiveness of the circuit breaker in terms of arc extinguishing.

9 Claims, 4 Drawing Sheets

(58) Field of Classification Search
CPC ...... H01H 1/20; H01H 71/1045; H01H 39/00; H01H 1/2025; H01H 2039/008
See application file for complete search history.

(56) References Cited

U.S. PATENT DOCUMENTS

| | | | | |
|---|---|---|---|---|
| 2017/0229267 | A1* | 8/2017 | Lell ........................ | H01H 3/222 |
| 2019/0198277 | A1 | 6/2019 | McTigue et al. | |
| 2021/0304974 | A1* | 9/2021 | Kanematsu ............ | H01H 71/28 |

FOREIGN PATENT DOCUMENTS

| | | | |
|---|---|---|---|
| EP | 3499541 | A1 | 12/2018 |
| WO | 2020/218977 | A1 | 10/2020 |

OTHER PUBLICATIONS

International Search Report for PCT/FR2022/051541, dated Dec. 21, 2022.

* cited by examiner

TWO-ELECTRIC-POLE CIRCUIT BREAKER ACTUATED BY A COMMON PYROTECHNIC DEVICE

CROSS-REFERENCE TO RELATED APPLICATIONS

This is the National Stage of PCT international application PCT/FR2022/051541, filed on Aug. 1, 2022, which claims the priority of French Patent Application No. 2108426, filed Aug. 3, 2021, both of which are incorporated herein by reference in their entireties.

The subject of the invention is a two-electric-pole, or bipolar, circuit breaker actuated by a common pyrotechnic device.

An electric pole is a system comprising at least a fixed electric contact and a mobile electric contact on an electric circuit, having a position for opening and a position for closing the circuit. The electric cutoff devices moving the mobile contact, called circuit breakers here, are often actuated by electromagnetic motors. These actuators offer speeds of movement and travel of the mobile contact that are relatively small, which limits the capacities for cutting off the electric arcs that appear when the contacts separate. Certain industrial circuit breakers comprise sealed chambers, filled with a dielectric gas and in which the contacts are placed, or devices for blowing a compressed gas at the moment of opening of the contacts, to increase the capacities for cutting off the arcs. These additional devices include disadvantages however, such as the toxic nature of the gases routinely used, such as $SF_6$, or the structural complications induced by the addition of the gas compression chamber.

The prior art also includes devices actuated by pyrotechnic devices. They have the advantages of better guaranteeing the cutoffs of the current and the extinctions of the arcs, even when the currents have a high intensity, during short-circuits for example, via a greater speed and greater travel of opening of the contacts.

The effects of the pyrotechnic actuators would however be even better ensured if they cut off the electric circuit at two or more poles simultaneously, by thus dividing the current or the voltage passing through each pole. The invention relates to such bipolar or multipolar pyrotechnic circuit breakers, capable of simultaneously opening all the poles.

The document closest to the invention appears to be EP 3 499 541 A1. It describes a circuit breaker equipped with a plurality of pyrotechnic charges, fingers for actuating the mobile contacts, and strikers connecting the pyrotechnic charges to the fingers. The strikers each comprise a rod pushed back by one of the charges, a lever that the rod pivots and which pushes back the associated finger. The levers are however mounted on a common axis of rotation, which makes it so that all the fingers are moved, and all the poles open, as soon as a single charge is ignited and a single rod moved. The other charges can be used later, for other openings of the circuit, by opening all the poles again.

This device satisfies the main goal of the invention, but the device of the strikers includes a large number of parts, since there is an independent transmission of movement for each rod and each finger.

Another document is WO 2020/218977 A1. The circuit breaker comprises two pyrotechnic charges and two mechanical actuators placed at two branches of a circuit, and capable of opening two poles. It is not however sought to obtain simultaneous openings of the poles, but on the contrary spread out over time. And the device also has the disadvantage of imposing an actuator, and here a charge, for each of the poles. The document US 2019/0198277 A1 describes a cutoff device comprising a pyrotechnic actuator to cut off high levels of current. The pyrotechnic cartridge when igniting propels a piston, which pushes back the cursor carrying the mobile contact with an energy sufficient to break a stop and move the mobile contact away from the fixed contacts by a distance much greater than by the maneuvering of a conventional electromagnetic actuator, also provided on this circuit breaker. The electromagnetic actuator is used, and sufficient, to open the electric circuit under normal circumstances; and the pyrotechnic actuator is used when the current is significant and produces arcs more difficult to extinguish. This circuit breaker is limited to the opening of a single electric pole composed of a mobile contact and of a pair of fixed contacts. It is furthermore inconvenient insofar as a breaking of a part occurs in the circuit-breaking mechanism itself, that is to say elsewhere than in the pyrotechnic actuator, when the latter is used: a repair of the circuit breaker is then necessary.

One object of the invention is to integrate a pyrotechnic device into a two (or more) pole circuit breaker, while preserving a simple structure, with a reduced bulk, while improving the first document cited via a mechanical actuator not divided between the various mobile contacts. Another object is to place the parts that are damaged or must be replaced after an ignition of a pyrotechnic charge in an annex portion of the device, in order to facilitate their replacement, optionally by a simple disassembly and reassembly of a component of the circuit breaker; while improving the third document, which includes a membrane against return of the rod into the core of the circuit breaker, imposing the total disassembly of the latter after each ignition to replace the membrane.

In a general form, the invention relates to an electric cutoff device comprising: at least a fixed contact and a mobile contact, which is mobile between a closing state in which it touches the fixed contact, and an opening state in which it is separated from it; a pyrotechnic actuator for switching the mobile contacts from the closing state to the opening state; characterised by: a part for linking the mobile contacts, said linking part being connected to the actuator by a transmission; stops carried by the linking part, distant from the mobile contacts in the closing state and respectively engaged on the mobile contacts in the opening state; the stops being placed on the linking part in such a way as to be engaged simultaneously on the mobile contacts.

Such a device allows the simultaneous opening of the two electric poles by the same pyrotechnic actuator, via a simplified mechanism comprising a single device for mechanical transmission between a part propelled by the explosion of the pyrotechnic charge and the mobile contacts; especially via the linking rod which connects all the stops of movement of the mobile contacts. This mechanism also guarantees very good simultaneity of the openings of the poles.

The design of the device is easy, with simple kinematics, if the linking part is a rectilinear rod.

The pyrotechnic actuator can thus indeed comprise a piston parallel to the rod, connected to the latter by a pivoting connecting rod that offers a reliable transmission, the bulk of which is reduced.

Advantageously, the pyrotechnic actuator comprises an envelope mounted on an outer face of a main case of the cutoff device that contains the electric poles and the linking part, and a transmission passing through a wall of the case connects the linking part to a mobile part of the pyrotechnic actuator. It is therefore easy to replace the actuator after use. Moreover, the arrangement of the cutoff device itself is not disturbed by the pyrotechnic actuator, which is added on outside of the main case, which helps keep the cutoff device compact.

This advantage is reinforced if the envelope of the pyrotechnic actuator contains an anti-return device, which prevents a return of the mobile part to an initial position, when a pyrotechnic charge of the pyrotechnic actuator has been ignited.

Means for cutting off the electric arcs can be added. They can include permanent magnets, divergent tracks for capturing opposite ends of the arc, and fins for sectioning the arc located between the tracks. All these devices, being purely static, do not complicate the structure of the device a lot. Their addition is easy, since, like the cutoff device, they can be installed around the electric poles, on the walls of a case containing the latter.

According to such an advantageous arrangement, the electric poles are housed in superimposed compartments of a case, the pyrotechnic device is assembled to an outer side of the case, and openings for evacuation of gas are made at another side of the case to connect the compartments to an outside environment.

A particularly advantageous arrangement is characterised in that the case is substantially parallelepipedic, comprises a control compartment aligned with the compartments housing the electric poles, the fixed contacts are placed through two first opposite sides of the case, and the openings are made through two other opposite sides of the case.

Another aspect of the invention is a direct-current circuit, characterised in that it comprises the cutoff device according to any one of the preceding claims, the poles being placed at two portions of the circuit that are connected in series.

According to a use particularly aimed at, this circuit is an electric distribution circuit in an airplane.

The invention will now be described in its various aspects, features and advantages, via the following drawings, which illustrate a specific embodiment thereof, given for purely illustrative purposes:

Figure 1:
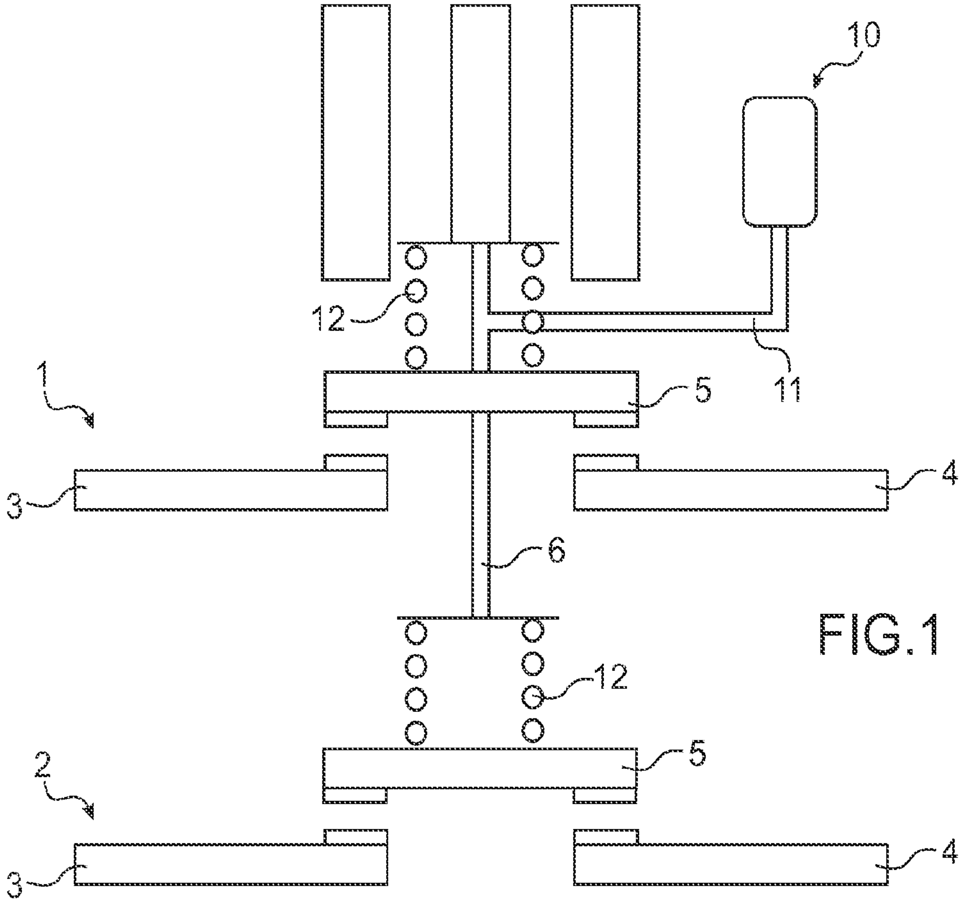
FIG. 1 is a diagram of the circuit breaker according to the invention.

The circuit breaker mainly comprises, according to FIG. 1, two electric poles 1 and 2, each comprising a pair of fixed contacts 3 and 4 as an extension but separate, and a mobile contact 5, moveable perpendicularly to the alignment of the fixed contacts 3 and 4 so as to join them and connect them, which gives a state of closing of the electric circuit in which the pole 1 or 2 is installed, or on the contrary be separated from them, which gives a state of opening of the circuit.

The mobile contacts 5 are connected to each other by a rod 6, which allows to move them together in order for the opening and closing states of the two poles 1 and 2 to be almost simultaneous. A pyrotechnic actuator 10 allows to move the rod 6 in its direction of extension by a transmission 11. The movements of the mobile contacts 5 are carried out by the pyrotechnic actuator 10. This occurs in the case of a short-circuit, in which the intensity of the current can reach for example 25 times the usual intensity. The use of the pyrotechnic actuator 10 allows to obtain both a greater travel of the mobile contacts and a much faster speed of separation of the contacts towards the opening state, capable of extinguishing the arcs and effectively opening the electric circuit on which the circuit breaker is placed, even in these difficult circumstances.

The mobile contacts 5 are suspended on the rod 6 by springs 12 which allow to apply them onto the fixed contacts 3 and 4 with sufficient force in the closing state, without mechanical rupture or permanent deformation, by compressing the springs 12.

Figure 2:
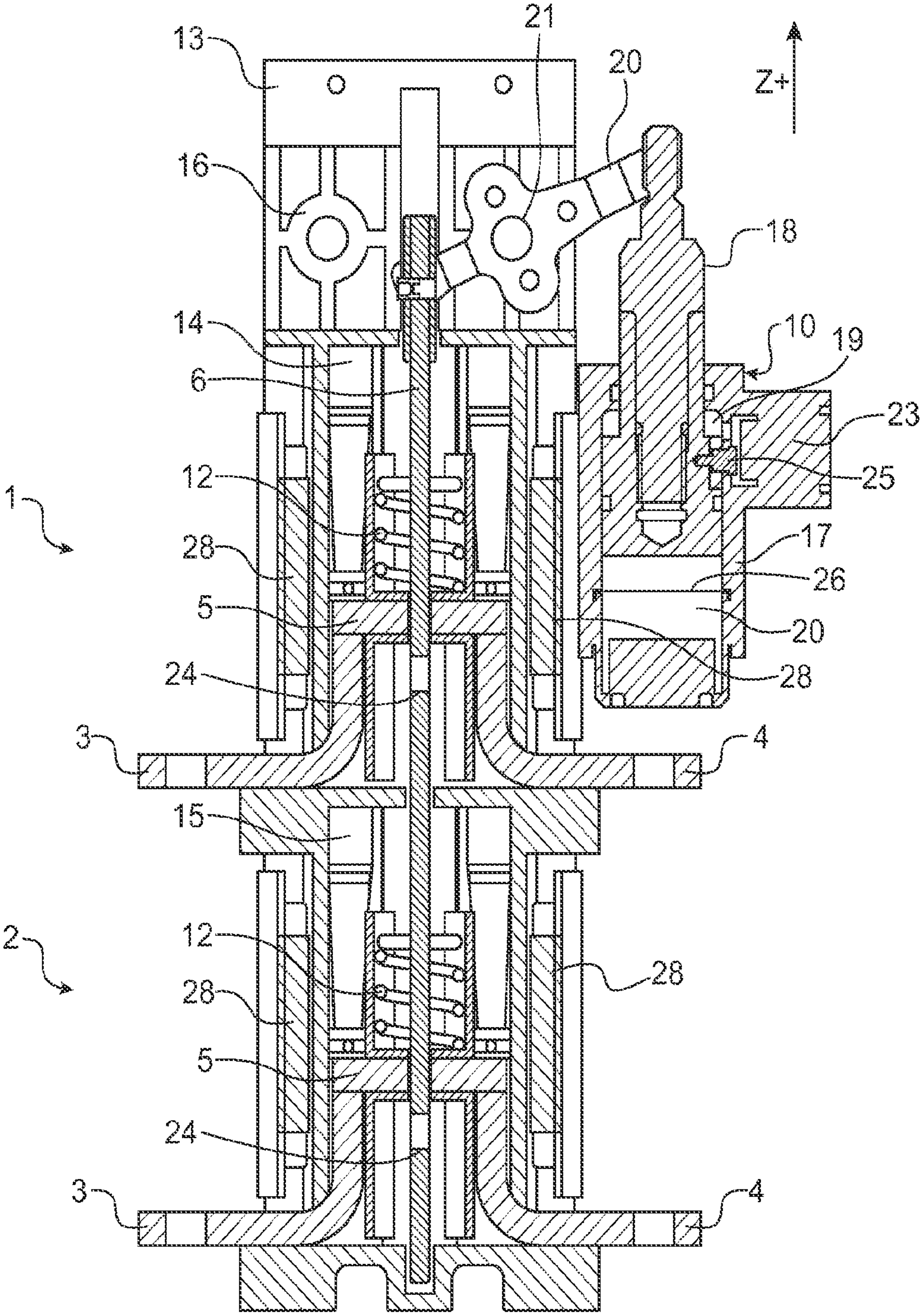
FIG. 2 shows in more detail the inner structure of the circuit breaker, with the actuation elements and the electric poles.

Reference is made to FIG. 2. The poles 1 and 2 are housed in a case 13 and more precisely in two superimposed compartments 14 and 15 of the latter. A control compartment 16, located on the others, contains the top of the rod 6.

The pyrotechnic actuator 10 is located outside the case 13, at the height of the compartment 14 immediately under the control compartment 16. It comprises an envelope 17, assembled onto the case 13 of the circuit breaker strictly speaking in a way that can be disassembled, in which a piston 18 that divides its inner volume into an upper chamber 19 and a lower chamber 20 slides. The rod of the piston 18 protrudes from the envelope 17. A pivoting connecting rod 20 is articulated at its ends to the top of the rod of the piston 18 and to an upper part of the rod 6 for actuating the mobile contacts 5. It pivots around a pivot 21 established in the control compartment 16, and passes through the wall of the case 13 via a slot thereof. The transmission 11 is thus composed of the connecting rod 20 and the pivot 21. A pyrotechnic charge 23 is disposed on the envelope 17.

The rod 6 is provided with two stops 24 which extend below the mobile contacts 5 and allow to lift them when the rod 6 is moved upwards, and to open the poles 1 and 2.

The pyrotechnic actuator 10 further comprises a blocking device 25 that can consist of a pin and which prevents the movements of the piston 18 as long as the pyrotechnic charge remains intact, and an anti-return device 26, which can consist of an elastic blade and which prevents the return of the piston 18 to its initial position, when the pyrotechnic charge has been ignited. The pyrotechnic actuator 10 is mounted on the case 13 of the circuit breaker by screws 27 (not shown completely) that allow to replace it easily.

Figure 3:
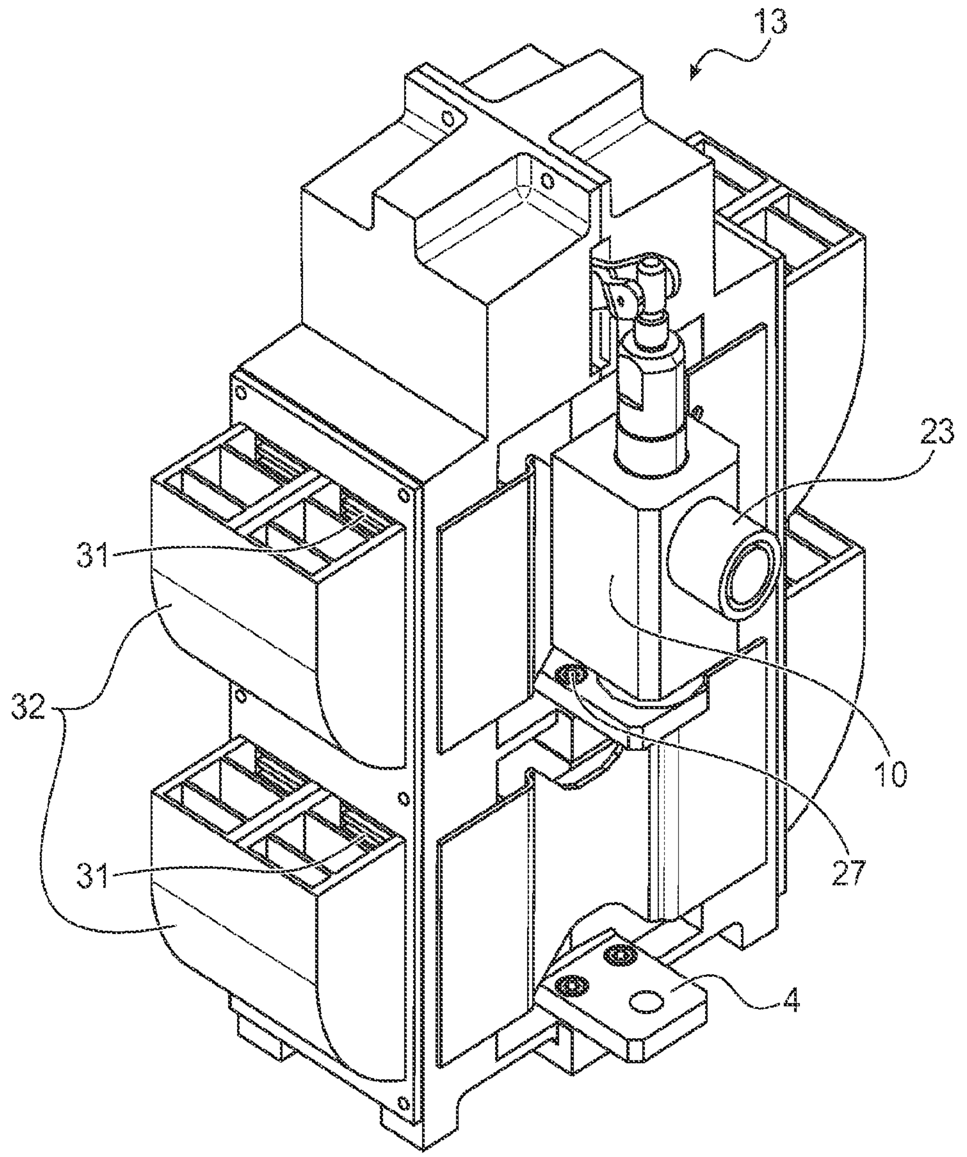
FIG. 3 shows the circuit breaker in an outside view.
Figure 4:
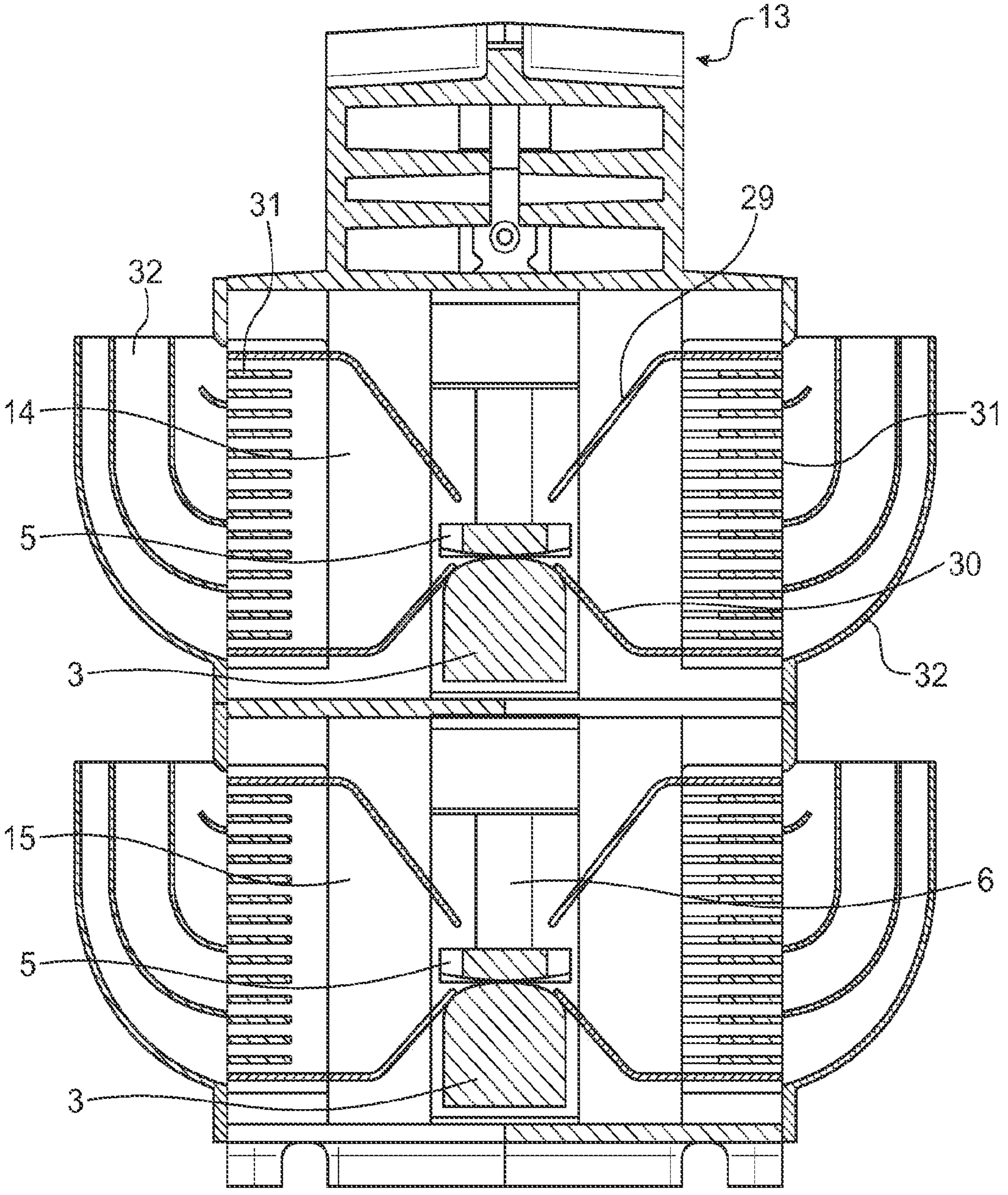
FIG. 4 shows a cross-section of the circuit breaker perpendicularly to FIG. 2.

When the pyrotechnic actuator 10 is used, the explosion gases coming from the pyrotechnic charge 23 spread through the upper chamber 19 and increase the pressure there until the rupture of the blocking device 25. The piston 18 is lowered in the vertical direction, in the downward direction labelled $Z^-$, the connecting rod 20 pivots and the rod 6 rises in the opposite direction $Z^+$. The stops 24 touch the mobile contacts 5 and raise them, while bringing about the opening state of the poles 1 and 2; their travel and their speed of opening are sufficient to produce the extinction of the four electric arcs that appear between the mobile contacts 5 and the fixed contacts 3 and 4, and which are thus four in number. The devices for extinguishing arcs that will now be described, while also using FIGS. 3 and 4, also facilitate their extinction.

Magnets 28 are disposed in the case 13 at the height of the poles 1 and 2. Pairs of conductive tracks 29 and 30 are associated with each arc and each fixed contact 3 or 4. In each of them, the upper track 29 and the lower track 30 are close to one another near the pole 1 or 2, and move apart while forming an angle towards the sides of the case 13. Horizontal fins 31 replace the wall of the case 13 at this location, while leaving between them outlet openings from the case 13 towards the outside. And nozzles 32, which are curved plates, extend outside of the case 13 in front of the openings, to guide and bend upwards the flows of pressurised gas coming from the compartments 14 and 15 and produced by the arcs. The nozzles 32, the fins 31, as well as the tracks 29 and 30, extend on two opposite sides of the parallelepipedic case 13, while the pyrotechnic actuator 10 and the magnets 28 are disposed on the two other sides, where the fixed contacts 3 and 4 also end.

The operation of the device is the following. When the poles 1 and 2 go to the opening state and arcs form between the fixed contacts 3 and 4 on the one hand and the mobile contacts 5 on the other hand, the magnets 28 move the feet of the arcs onto the adjacent ends of the conductive tracks 29 and 30, then along these tracks towards the outside of the case 13; the arcs are elongated via the increasing distance between the upper 29 and lower 30 tracks, lose their cohesion and end up being sectioned by the fins 31. The very hot gases produced by the arcs are evacuated from the case 13 by the nozzles 32, and ejected upwards.

Throughout this detailed embodiment, it was supposed that the direction Z is vertical, the rod 6 extending in this direction, and the compartments 15, 14 and 16 being superimposed in this order in the direction $Z^+$. The invention would function just as well with different orientations, and different arrangements, of the circuit breaker.

Figure 5:
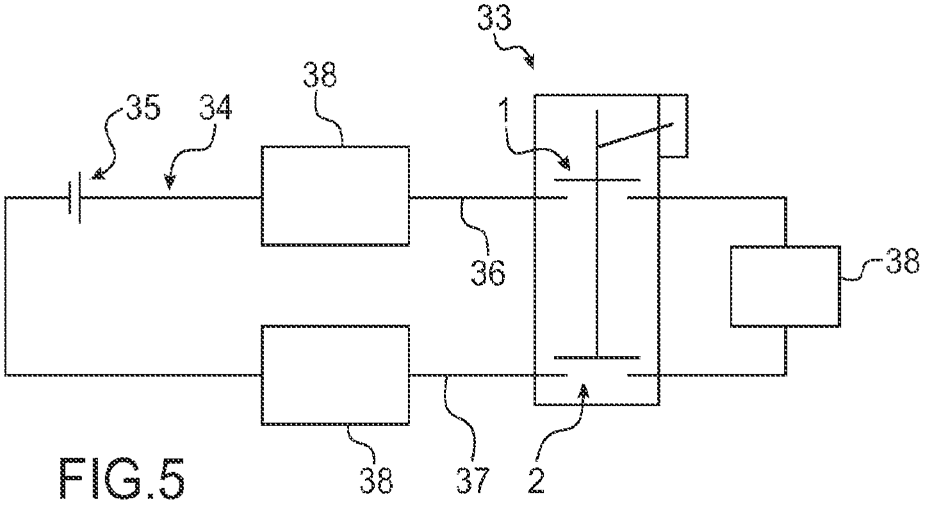
FIG. 5 shows a circuit on which the circuit breaker is installed.

FIG. 5 shows a favourable use of the invention. The circuit breaker carries the reference 33, and it is disposed on an electric circuit 34 powered by a generator 35 of direct current, optionally bidirectional. One of the branches 36 of the circuit 34 carries the electric pole 1, and another branch 37, in series with the previous one, the other electric pole 2. Loads 38, which consume electric power, are placed at various positions of the circuit 34, in particular between the poles 1 and 2. These can be apparatuses inside an airplane and which are powered by the generator 35. The circuit breaker 33 can of course be used for other uses or other electric circuits.

What is claimed is:

1. Electric cutoff device, comprising: two electric poles, each of the poles comprising at least a fixed contact and a mobile contact, which is mobile between a closing state in which the mobile contact touches the fixed contact, and an opening state in which the mobile contact is separated from the fixed contact; a pyrotechnic actuator for switching the mobile contacts from the closing state to the opening state; characterised by: a linking part for linking the mobile contacts, said linking part being connected to the pyrotechnic actuator by a transmission; stops carried by the linking part, distant from the mobile contacts in the closing state and respectively engaged with the mobile contacts in the opening state; wherein the stops being placed on the linking part so as to be engaged simultaneously with the mobile contacts, and wherein the linking part is a rectilinear rod, the stops are spread out on the rod, and the mobile contacts are aligned in a direction of the rod.

2. The device according to claim 1, wherein the pyrotechnic actuator comprises a piston mobile parallel to the rod, and a pivoting connecting rod connecting the piston to the rod.

3. The device according to claim 1, wherein the pyrotechnic actuator comprises an envelope mounted on an outer face of a main case of the cutoff device that contains the electric poles and the linking part, and wherein a transmission passing through a wall of the case connects the linking part to a mobile part of the pyrotechnic actuator.

4. The device according to claim 3, wherein the envelope of the pyrotechnic actuator contains an anti-return device, which prevents the return of the mobile part to an initial position, when a pyrotechnic charge of the pyrotechnic actuator has been ignited.

5. The device according to claim 1, further comprising means for cutting off an electric arc that includes permanent magnets, divergent tracks for capturing opposite ends of the arc, and fins for sectioning the arc located between the tracks.

6. The device according to claim 1 wherein the electric poles are housed in superimposed compartments of a case, the pyrotechnic actuator is assembled to an outer side of the case, and openings for evacuation of gas are made through at least one other side of the case to connect the compartments to an outside environment.

7. The device according to claim 6, wherein the case is substantially parallelepipedic, and comprises a control compartment aligned with the compartments housing the electric poles, the fixed contacts are placed through two first opposite sides of the case, and the openings are made through two other opposite sides of the case.

8. A direct-current circuit comprising, the cutoff device according to claim 1, wherein the poles are placed at two portions of the circuit connected in series.

9. An electric distribution circuit of an airplane comprising the direct-current circuit according to claim 8.

* * * * *